United States Patent
Kim et al.

(10) Patent No.: US 9,550,925 B2
(45) Date of Patent: Jan. 24, 2017

(54) ENVIRONMENT-FRIENDLY ADHESIVE COMPOSITION AND TAPE MANUFACTURED USING THE SAME

(71) Applicants: Hyundai Motor Company, Seoul (KR); CHEM-CO Co., Ltd., Cheonan, Chungcheongham-Do (KR)

(72) Inventors: Min Su Kim, Ulsan (KR); Jae Chan Lim, Ulsan (KR); Sun Yong Shin, Ulsan (KR); Sei Youn Ko, Chungcheongnam-Do (KR)

(73) Assignees: Hyundai Motor Company, Seoul (KR); Chem-Co Co., Ltd., Cheonam, Chungcheongnam (KR)

( * ) Notice: Subject to any disclaimer, the term of this patent is extended or adjusted under 35 U.S.C. 154(b) by 0 days.

(21) Appl. No.: 14/321,009

(22) Filed: Jul. 1, 2014

(65) Prior Publication Data
US 2015/0064461 A1    Mar. 5, 2015

(30) Foreign Application Priority Data
Aug. 30, 2013   (KR) ........................ 10-2013-0104167

(51) Int. Cl.
```
B32B 7/12       (2006.01)
C09J 133/08     (2006.01)
C09J 7/02       (2006.01)
C09J 133/06     (2006.01)
C09J 11/04      (2006.01)
```

(52) U.S. Cl.
CPC ............ *C09J 133/08* (2013.01); *C09J 7/0207* (2013.01); *C09J 7/0246* (2013.01); *C09J 7/0275* (2013.01); *C09J 7/0282* (2013.01); *C09J 7/0285* (2013.01); *C09J 11/04* (2013.01); *C09J 133/06* (2013.01); *C09J 2201/122* (2013.01); *C09J 2201/606* (2013.01); *C09J 2423/046* (2013.01); *C09J 2433/00* (2013.01); *C09J 2467/006* (2013.01); *C09J 2479/086* (2013.01); *Y10T 428/287* (2015.01)

(58) Field of Classification Search
None
See application file for complete search history.

(56) References Cited

U.S. PATENT DOCUMENTS

| | | | |
|---|---|---|---|
| 4,217,434 A * | 8/1980 | Koeble | C09J 133/08 156/326 |
| 5,851,663 A * | 12/1998 | Parsons | C08K 5/0066 428/352 |
| 2002/0102401 A1* | 8/2002 | Hanai | C08K 5/03 428/343 |
| 2009/0324868 A1* | 12/2009 | Tamai | B65H 19/283 428/41.6 |

FOREIGN PATENT DOCUMENTS

| | | |
|---|---|---|
| JP | 09-279113 | 10/1997 |
| KR | 10-2004-0030168 A | 4/2004 |
| KR | 10-2007-0007974 | 1/2007 |
| KR | 10-2009-0079711 A | 7/2009 |
| KR | 10-1038922 | 5/2011 |
| KR | 10-2012-0051596 | 5/2012 |
| WO | 94/12987 | 6/1994 |

OTHER PUBLICATIONS

Istvan, Benedek et al., "Pressure-Sensitive Adhesives Technology", 1997, Marcel Dekker Inc., p. 77.*
Machine translation of Koream Unexamined Patent Application KR 10-2006-7027343A, published on Jan. 16, 2007.*
Machine translation of Korean Application Publication KR 20090079711A, published on Jul. 22, 2009.*
Se-yoon Koh et al., "Method for Producing Tapes Without Using Toluene At All", English translation of KR 1020120051596, published on May 22, 2012.*
McMichael AJ, "Carcinogenicity of benzene, toluene and xylene: epidemiological and experimental evidence", abstract, IARC Sci Publ, 1998, vol. 85.*

* cited by examiner

*Primary Examiner* — Anish Desai
(74) *Attorney, Agent, or Firm* — Mintz Levin Cohn Ferris Glovsky and Popeo, P.C.; Peter F. Corless

(57) ABSTRACT

An environment-friendly adhesive composition is provided that includes about 10 to about 70 parts by weight of a tackifying agent base including an acryl-based attaching agent as a raw material, about 5 to about 40 parts by weight of a terpene-based tackiness improver, about 0.5 to about 5 parts by weight of an epoxy-based crosslinking agent, about 5 to about 60 parts by weight of a flame retardant, and a combination thereof, based on 100 parts by weight of a solvent excluding benzene, toluene and xylene (BTX). The flame retardant includes at least one selected from a group consisting of a halogen-based flame retardant, an antimony flame retardant, and a phosphorus-based flame retardant. The adhesive composition and a tape manufactured using the same may be used exclusively in a vehicle industry, and in various electronic industries.

4 Claims, 3 Drawing Sheets

ENVIRONMENT-FRIENDLY ADHESIVE COMPOSITION AND TAPE MANUFACTURED USING THE SAME

CROSS-REFERENCE TO RELATED APPLICATIONS

This application claims priority to and the benefit of Korean Patent Application No. 10-2013-0104167 filed in the Korean Intellectual Property Office on Aug. 30, 2013, the entire contents of which are incorporated herein by reference.

TECHNICAL FIELD

The present invention relates to an environment-friendly adhesive composition and a tape manufactured using the same, and particularly relates to an environment-friendly adhesive composition which can be widely applied in a vehicle industry and an electronic industry, and the like. The present invention provides an environment-friendly adhesive composition that may include a tackifying agent base, a terpene-based tackiness improver (i.e., a tackifier), a crosslinking agent, and a small amount of flame retardant in a solvent which does not contain aromatic petrochemicals, such as benzene, toluene and xylene (BTX); and a tape manufactured using the same adhesive composition.

BACKGROUND

In recent manufacturing industries, various adhesives and tape-type adhesive materials have been extensively used. Meanwhile, many countries have strengthened environmental regulations on such industrial products used particularly in electronic products, vehicles, and the like. Therefore, reducing the amount of volatile organic compounds (VOC) and odorous pollutions during the manufacturing of such products has been an outstanding issue in the vehicle industry. Furthermore, there have been continuous needs for developing a high-functional tape having superior tackiness and flame retardancy.

Vehicle manufacturers have made efforts to reduce vehicle weight, and the materials used in vehicle manufacturing have been extended to include non-ferrous metals. Accordingly, a demand for adhesives and tackifying tapes has also increased. For example, a headliner of a vehicle, which is apart for reducing a body weight in a vehicle, is formed of a combination of materials including an expandable resin.

However, when such materials are used, the body strength of a vehicle may be deteriorated, and further deformation of an intrinsic shape of a vehicle may occur during operation and storage. Accordingly, metal brackets are often attached to a headliner to fix the headliner. In addition, materials for parts of a vehicle may have environment-friendly properties from development steps to meet environmental requirements of the vehicle industry while having high tackifying property and flame retardancy.

Among numerous vehicle parts, a headliner may be made of expandable resin, and a shape of the headliner may be bent or deformed during operation, transportation, and storage. To prevent such damages, a metal bracket is often attached to the headliner. When the bracket is not sufficient to fix the headliner, a driver or any passengers may be significantly threatened during an accident. Thus, securely attached brackets to the headliner are critical items in manufacturing of the vehicle. When such a headliner structure with the brackets attached is included, the conventional manufacturing method may not be efficient because the weight of the vehicle increases and the productivity of manufacturing decrease.

Alternatively, a tape that fixes the headliner with the bracket for the exclusive use of vehicles may be one of the most suitable solutions for the aforementioned problems. Thus, such an adhesive or a tape may be required to exhibit high attachment strength with a material having a rough surface of the headliner.

In recent developments of adhesive materials, an acryl-based aqueous pressure-sensitive adhesive composition has been developed. However, such acryl-based aqueous pressure-sensitive adhesive composition has limitations. For example, phenol may be thermally decomposed and a benzene derivative may be generated during a heat reaction due to a terpene phenol resin used in the manufacturing of such adhesives, causing harmful contaminants to be discharged. In other example, a method of manufacturing a tape coated with an acryl-based attaching agent, and a tackifying tape to which ethyl acetate and acetone have been developed. However, problems in maintaining flame retardancy and high attachment strength may occur.

SUMMARY

The present invention provides a high-functional tape that includes reduced amounts of VOCs (volatile organic compounds) and odor and exhibiting high attachment strength and significantly improved flame retardancy securing safety in the event of fire and the like. Particularly, the present invention provides an adhesive composition comprising an acryl-based attaching agent, a terpene-based tackiness improver, an epoxy-based crosslinking agent, and a flame retardant in a solvent that excludes BTX solvents; and a tape which is exclusively used in vehicles for optimum performance and manufactured by the same adhesive composition thereof.

Moreover, the present invention provides an adhesive composition including significantly reduced amounts of volatile organic compounds (VOCs) and odors by reducing unreacted monomers and a residual solvent. In addition, the present invention provides a high-functional tape, which is manufactured using the same adhesive composition thereby having high attachment strength and self-extinguishability in fire due to internally and externally improved flame retardancy.

In an exemplary embodiment of the present invention, an environment-friendly adhesive composition may include: about 10 to about 70 parts by weight of a tackifying agent base including an acryl-based attaching agent as a raw material; about 5 to about 40 parts by weight of a terpene-based tackiness improver; about 0.5 to about 5 parts by weight of an epoxy-based crosslinking agent; and about 5 to about 60 parts by weight of a flame retardant including at least one selected from the group consisting of a halogen-based flame retardant, an antimony flame retardant, a phosphorus-based flame retardant and a combination thereof, based on 100 parts by weight of a solvent excluding BTX.

In another exemplary embodiment of the present invention, a tape may be manufactured using the environment-friendly adhesive composition.

The adhesive composition according to the present invention may provide an environment-friendly adhesive material having significantly reduced odor and VOCs content by reducing unreacted monomers and a residual solvent. The tape manufactured using the adhesive composition may have a high tackiness, and a high-functional property by improving flame retardancy in the case of a fire due to internal and external effects. According to the present invention, the adhesive composition and the tape manufactured using the same may be environment-friendly and may have high (e.g., improved) tackiness and flame retardancy, and thus may be widely applicable to various industries, such as a vehicle industry and an electronic industry.

BRIEF DESCRIPTION OF THE DRAWINGS

The above and other features and advantages of the present invention will become more apparent by describing in detail exemplary embodiments thereof with reference to the attached drawings in which.

Figure 1:
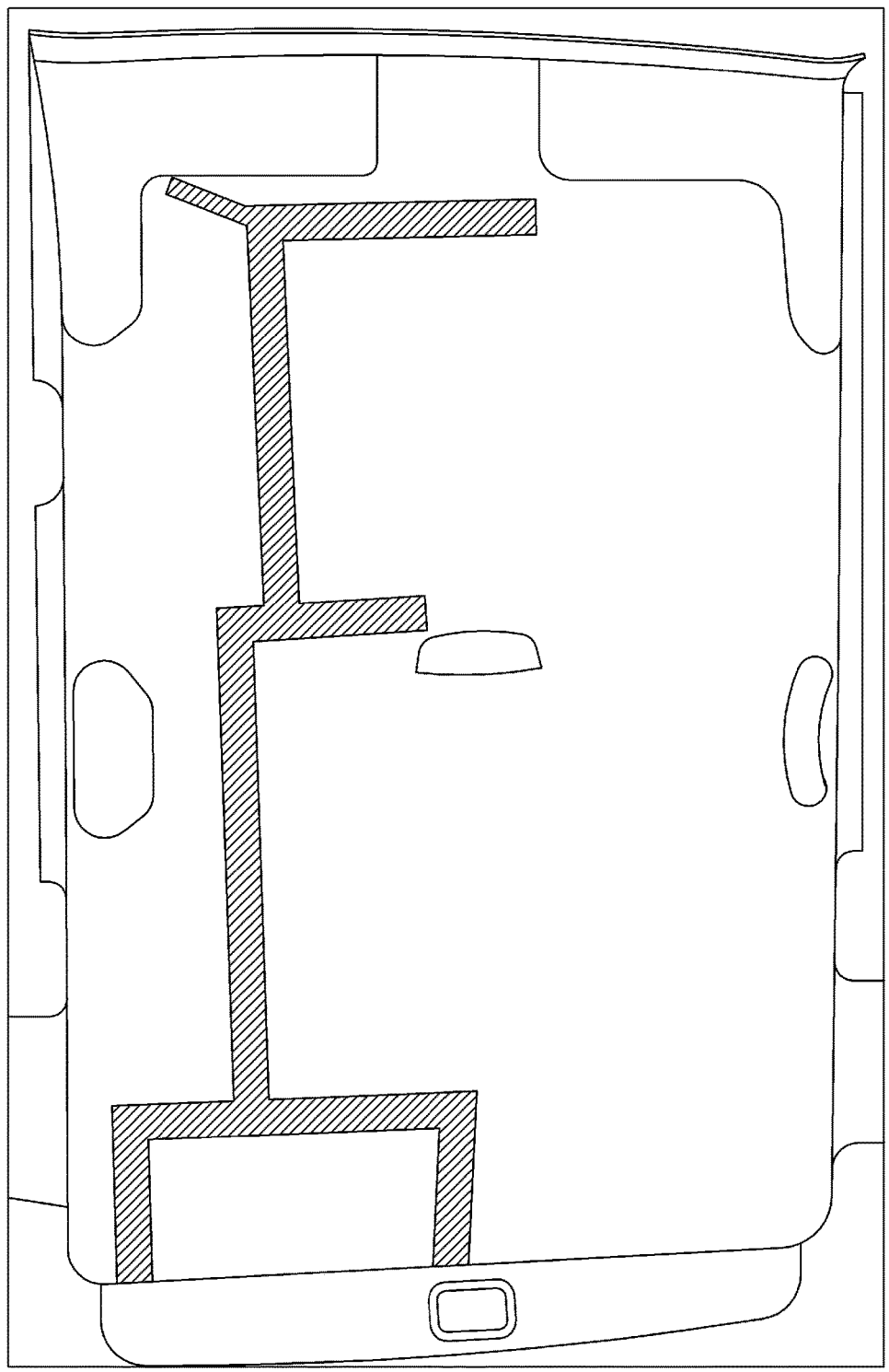
FIG. 1 is an exemplary image of a headliner of a vehicle according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

It is understood that the team "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention provides an environment-friendly adhesive composition comprising about 10 to about 70 parts by weight of a tackifying agent base including an acryl-based attaching agent as a raw material; about 5 to about 40 parts by weight of a terpene-based tackiness improver; about 0.5 to about 5 parts by weight of an epoxy-based crosslinking agent; and about 5 to about 60 parts by weight of a flame retardant including at least one selected from the group consisting of a halogen-based flame retardant, an antimony flame retardant, a phosphorus-based flame retardant and a combination thereof, based on 100 parts by weight of a solvent excluding BTX.

In an exemplary embodiment, the solvent may include about 5 to about 40 wt % of a $C_2$ to $C_{10}$ fatty acid ketone compound, about 20 to about 80 wt % of a $C_1$ to $C_{10}$ acetate compound, about 1 to about 10 wt % of a $C_1$ to $C_{10}$ alcohol compound, and about 1 to about 50 wt % of a normal/cyclohexane compound, based on the total weight of the solvent. In particular, in the solvent, the $C_1$ to $C_{10}$ acetate compound and the $C_2$ to $C_{10}$ fatty acid ketone compound may be mixed at a ratio of about 80 to about 85:about 15 to about 20. Further, the ratio between the $C_1$ to $C_{10}$ acetate compound and the $C_2$ to $C_{10}$ fatty acid ketone compound may be, without limitation, 80:20. The ratio may be optimized for a polymer compatibility and the polymer synthesis condition. For example, the solvent may be used, without limitation, by mixing ethyl acetate and acetone at a ratio of about 80:20.

According to the invention, the solvent may not include BTX that represents aromatic chemical products of benzene (B), toluene (T), and xylene (X). By removing BTX compounds from the solvent in the present invention, the solvent may be used as an environment-friendly material and reduce VOC.

The tackifying agent base may be, without limitation, selected from the group consisting of silicon series, hot melt series, and acryl series, and the acryl series may be used as a main raw material. According to an exemplary embodiment of the present invention, a monomer having about 1 to 17 carbon chains may be used as the acryl-based attaching agent. In particular, the monomer having about 2 to 8 carbon chains may be used for an adhesive having a glass transition temperature of about −70 to about −10° C. Considering characteristics of a vehicle, the glass transition temperature may be about −40±10° C., and thus performance of the tackifying agent may be exhibited in an extremely cold region.

A conventional monomer or a methacrylate-based monomer may be used as the acryl-based monomer. The acryl-based monomer may include, without limitation, a homo-copolymer, a 2-membered copolymer, a 3-membered copolymer, a 4-membered copolymer, and a 5-membered copolymer. During the crosslinking reaction of the polymers, copolymerization may occur with one monomer having a functional group including, without limitation, an acid, epoxy, hydroxy, or amine group in an amount of about 0.5 to about 10 parts by weight or less based on the total weight of the entire monomers.

In another exemplary embodiment, a main monomer may be, without limitation, butyl acylate (BAM), 2-hexyl ethyl acrylate (2-HEA), or a mixture thereof. For example, butyl acylate (BAM) or 2-ethyl hexyl acrylate (2-EHA) has the glass transition temperature (Tg) of about −70 to about −40° C., and is classified as a soft attaching agent. Bam or 2-eha may improve initial wettability to increase initial attachment strength. Since a curing density may be adjusted by the curing agent which provides high heat resistance, BAM and 2-EHA may be used as the curing agent.

The tackifying agent base may be used in an amount of about 10 to about 70 parts by weight based on 100 parts by weight of the solvent excluding BTX. In particular, the amount of the tackifying agent base may be about 30 to about 50 parts by weight based on 100 parts by weight of the solvent excluding BTX. When the amount of the tackifying agent base is less than about 10 parts by weight, the molecular weight of the tackifying agent base may not increase for exhibiting Pressure Sensitive Adhesive (PSA) property. In contrast, when the amount is greater than about 70 parts by weight, a stable synthesis of the adhesive may not occur by instantaneous heat emission because a free radical reaction is an exothermic reaction. Therefore, the tackifying base within the aforementioned range may be used.

The tackiness improver may be a terpene-based resin which may not discharge harmful materials such as phenol and toluene but may provide high (e.g., improved) attachment strength of the adhesive. The tackiness improver may be used in an amount of about 5 to about 40 parts by weight based on 100 parts by weight of the solvent excluding BTX. In particular, the amount of the tackiness improver may be about 10 to about 20 parts by weight based on 100 parts by weight of the solvent excluding BTX. When the amount of the tackiness improver is less than about 5 parts by weight, the attachment strength may not increase. When the amount is greater than about 40 parts by weight, the curing degree of the attaching agent may increase and the tackiness improver may not be suitable to be used in a tape. Thus, the tackiness improver may be used within the aforementioned range.

The crosslinking agent may be, without limitation, an epoxy-based resin. The crosslinking agent may be used in an amount of about 0.5 to about 5 parts by weight based on 100 parts by weight of the solvent excluding BTX. In particular, the amount of the crosslinking agent may be about 0.5 to about 1.7 parts by weight based on 100 parts by weight of the solvent excluding BTX. When the amount of the crosslinking agent is less than about 0.5 parts by weight, the heat resistance maintenance strength of the adhesive may be reduced. When the amount is greater than about 5 parts by weight, the attachment strength may be reduced. Thus the crosslinking agent may be used within the aforementioned range.

The flame retardant may be a halogen-based flame retardant or a nonhalogen-based flame retardant based on a composition. In another aspect, the flame retardant may be a solid-phase flame retardant or a liquid-phase flame retardant based on a phase. The flame retardant may affect attachment strength which is a basic physical property of the attaching agent based on its composition and the phase. Particularly, when the flame retardant is in a solid phase, the attachment strength of the attaching agent may be significantly reduced but the cohesive force of the attaching agent may increase. When the flame retardant is in a liquid phase, the attachment strength may increase but, the cohesive force may be reduced. Furthermore, compatibility between the flame retardant and the attaching agent should improve, any chemical reaction should not occur after mixing, and basic physical properties of the attaching agent should improve to maintain flame retardancy and attachment strength.

According to the present invention, the flame retardant may include at least one selected from the group consisting of halogen-based flame retardant, the antimony flame retardant, the phosphorus-based flame retardant and a combination thereof, and may be included in used in an amount of about 5 to about 60 parts by weight based on 100 parts by weight of the solvent excluding BTX. In particular, a mixture of the halogen-based flame retardant and the antimonium flame retardant mixed at a ratio of about 90 to 100:about 45 to 50 may be included. In an exemplary embodiment, a solid type bromo flame retardant (e.g., decabromodiphenyl oxide) may be used as the halogen, and an antimony trioxide flame retardant (e.g., antimony trioxide) may be used as the antimonium flame retardant. The aforementioned mixing ratio between the halogen-based flame retardant and the antimonium flame retardant may be optimized to improve the attachment strength and provide flame retardancy. In addition, the present invention may include a liquid type phosphorus-based flame retardant in the flame retardant.

When the halogen-based flame retardant and the antimonium flame retardant are mixed, the halogen-based flame retardant and the antimonium flame retardant may be mixed at a ratio of about 90 to 100:about 45 to 50 to secure flame retardancy. In particular, flame retardancy may be improved at a ratio of about 100:50. When the liquid type phosphorus-based flame retardant is mixed, attachment strength of the adhesive may be of about 3,000 g/inch or more and self-extinguishability of the adhesive may be achieved, thereby the adhesive satisfying both high attachment strength and flame retardancy may be manufactured. In addition, when, the liquid type phosphorus-based flame retardant is mixed in an amount of about 2 to 5 parts by weight based on the solvent to increase attachment strength as the tackifying tape, tackiness may be improved.

As described above, in one exemplary embodiment of the invention, the flame retardant may be included in an amount of about 5 to about 60 parts by weight based on 100 parts by weight of the solvent excluding BTX. In particular, the amount of the flame retardant may be about 10 to 20 parts by weight based on 100 parts by weight of the solvent excluding BTX. When the amount of the flame retardant is less than about 5 parts by weight, poor flame retardancy may result. In contrast, when the amount is greater than about 60 parts by weight, deterioration in tackiness may result. Accordingly, the flame retardant may be used within the aforementioned range.

Figure 3:
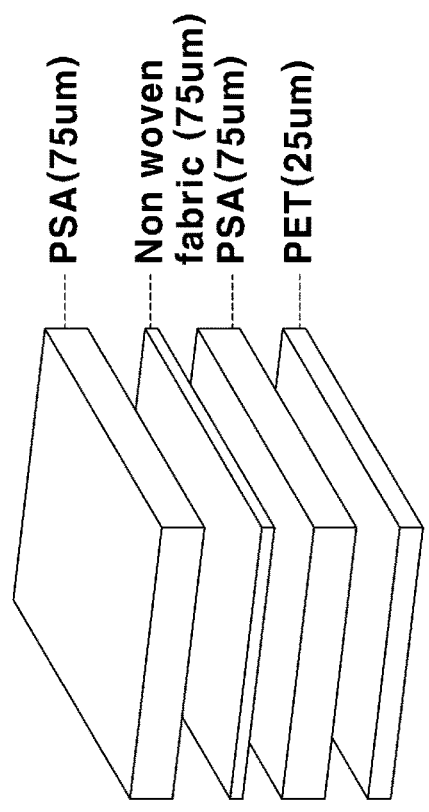
FIG. 3 illustrates an exemplary scheme of a tape manufactured using an adhesive composition according to an exemplary embodiment the present invention.
Figure 3:
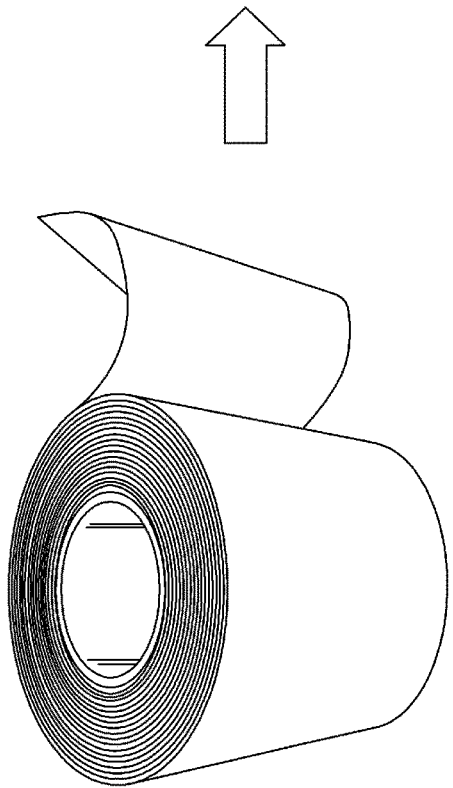

According to the present invention, a tape may be manufactured by applying the adhesive including the environment-friendly adhesive composition on a base material. For example, FIG. 3 illustrates a tape manufactured using the adhesive composition according to one embodiment of the present invention. The base material for manufacturing the tape may be, without limitation, selected from the group consisting of polyethylene terephthalate (PET), polyethylene (PE), and polyimide (PI). In one exemplary embodiment, PET is a substantially hard material and may absorb an impact by buffering actions and may be more suitable to be used as the base material of tape.

Figure 2:
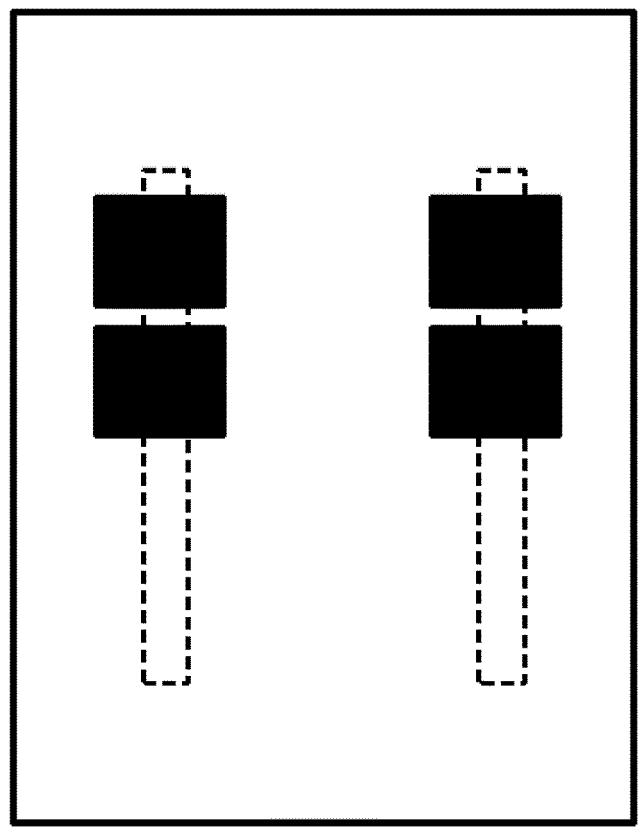
FIG. 2 illustrates an exemplary view of the headliner and a bracket of the vehicle according to an exemplary embodiment of the present invention.

As described above, the adhesive composition according to an exemplary embodiment of the present invention may be environment-friendly and may have a high-functional property such as high tackiness and flame retardancy. Thus, the adhesive composition of the present invention may be more suitably used to attach a bracket to a headliner of the vehicle and maintain a shape thereof. Particularly, since the headliner has a rough surface, it is essential for the adhesive to have high tackifying strength. The present invention provides such adhesive or tape manufactured which is necessary in vehicle manufacturing. FIGS. 1 and 2 illustrate the headliner and the bracket of the vehicle according to an exemplary embodiment of the present invention.

Hereinafter, the present invention will be described in more detail through Examples. However, the Examples are set forth to illustrate the present invention, but the scope of the present invention is not limited thereto.

Examples 1 to 3

The adhesive compositions were formed according to the composition of the tackifying agent base in Table 1 below and the composition ratio in Table 2 below. The complex-structured tape was manufactured as shown in FIG. 3. The tackifying agent PSA layer having a thickness of 75 μm was coated on the black PET film, the non-woven fabric having the thickness of 75 μm was laminated thereon, the tackifying agent PSA layer having the thickness of 75 μm was coated again, and the manufactured adhesive was coated on the PET film. Once the adhesive was coated on the PET film, odors were reduced by sufficiently volatilizing odorous elements and gradually increasing the temperature from the initial mild temperature to the temperature about 110° C. during the dry process to maximally suppress coating of the tackifying agent. The odor was reduced by volatilizing residual odor elements during the long-term aging period at the temperature of about 43° C., thereby manufacturing the tape sample.

TABLE 1

Composition of the tackifying agent base (unit: parts by weight)

| Component | 2EHA (2-Ethyl Hexyl Acrylate) | BAM (butyl acylate) | EAM (Ethyl acrylate) | VAM (Vinyl acetate monomer) | AA (Acrylic acid) | 2HAMA (2-hydroxy ethyl methacrylate) |
|---|---|---|---|---|---|---|
| Tackifying agent base | 40 | 30 | 10 | 10 | 5 | 5 |

Comparative Examples 1 to 3

The tape samples of Comparative Examples 1 to 3 were manufactured according to the compositional ratio of the following Table 1 by the same method as Examples 1 to 3.

sion ratio was obtained by dividing the weight average molecular weight (Mw) by the number average molecular weight (Mn). A reference with the odor rating of 4 scales or more is set in comparison to the standard sample. The improvement of conversion ratio represents a subsequent reduction of odor.

(3) Measurement of tackifying strength: The attachment strength was measured by standard KS A 1107 test method. The unit was represented by g/inch. The KS A 1107 test method is for the tackifying tape and the tackifying sheet, and the test piece of a tape or a sheet has a width of 25 mm and a length of 250 mm of the sampled area. The tackifying tape having the area of 1 inch×6 inch was adhered to the stainless steel plate (e.g., SUS 304) sample, the roller having the weight of 2 kg reciprocated one time to perform adhesion, and attachment strength was measured at the tensile speed (300±30 mm/min) after 30 minutes by the 180° peel strength of the test method.

TABLE 2

Adhesive compositions according to Examples 1 to 3 and Comparative Examples 1 to 3 (unit: parts by weight)

| Classification | | Example 1 | Example 2 | Example 3 | Comparative Example 1 | Comparative Example 2 | Comparative Example 3 |
|---|---|---|---|---|---|---|---|
| Solvent | Ethyl acetate | 80 | 80 | 80 | 70 | 75 | 90 |
| | Acetone | 20 | 20 | 20 | 30 | 25 | 10 |
| Tackifying agent base | Component of Table 1 | 45 | 45 | 45 | 75 | 80 | 85 |
| Tackiness improver | Terpene | 15 | 10 | 9 | 3 | 50 | 70 |
| Crosslinking agent | Epoxy-based resin | 1 | 1 | 1 | 0.3 | 6 | 10 |
| Flame retardant | Decabromo diphenyl oxide (solid) | 8 | 8 | 8 | 2 | 30 | 50 |
| | Antimony trioxide (solid) | 4 | 4 | 4 | 1 | 30 | 10 |
| | Triethyl phosphate (liquid) | 2 | 2 | 2 | 1 | 10 | 15 |

Experimental Example

Measurement of Physical Properties

Physical properties of the samples manufactured according to Examples 1 to 3 and Comparative Examples 1 to 3 were measured by the following method. The results are described in Table 3 below. The physical property results described in the Table 4 below provide average values excluding the highest and the lowest values after five tape samples were measured. The test method thereof is described as follows (1) Measurement of VOC amount: The amount of the discharged VOC was measured by standard MS 300-55 test method. The unit of the discharged VOC amount was μg/m³.

(2) Measurement of odor: The amount of the odor was measured by standard MS 300-34 test method. The conver- (4) Measurement of flame retardancy: Flame retardancy was measured by the simplified test method described in Table 3.

TABLE 3

Test item of flame retardancy

| Test item | Unit | Result value | Test method |
|---|---|---|---|
| Combustion distance | mm | 0 | MS 300-8 |
| Combustion time | s | 0 | |
| Combustion speed | mm/min | S.E. | |

* S.E.: Self-extinguishability

The samples manufactured according to Examples 1 to 3 and Comparative Examples 1 to 3 were measured by the aforementioned testing methods, and the results are described in the following Table 4.

TABLE 4

Results of physical properties

| Classification | | Example 1 | Example 2 | Example 3 | Comparative Example 1 | Comparative Example 2 | Comparative Example 3 |
|---|---|---|---|---|---|---|---|
| Measurement of VOC (μg/m$^3$) | | 126 | 78 | 94 | 253 | 117 | 194 |
| Measurement of odor | Conversion ratio (%) | 99 | 99 | 99 | 93 | 94 | 95 |
| | Odor rating | 3.5 | 3.5 | 3.5 | 5 | 5 | 4.5 |
| Measurement of attachment strength (g/inch) | | 3,005 | 3,125 | 2,815 | 2,745 | 1,811 | 1,288 |
| Measurement of flame retardancy | | S.E. | S.E. | S.E. | N.G. | S.E. | S.E. |

As evidenced in Table 4, the tape manufactured using the adhesive composition according to Examples 1 to 3 of the present invention, the amounts of VOC and odor released from the tape are significantly reduced, the tackifying strength is high (e.g., improved), and the flame retardancy becomes improved. Thus, the tape may be more suitably and widely used in the vehicle industry.

The present invention may be widely applied to an electronic industry, a vehicle industry, or the like, and particularly may provide a tape for the exclusive use of vehicles exhibiting optimum performance.

What is claimed is:

1. An environment-friendly adhesive composition comprising:
   about 10 to about 70 parts by weight of a tackifying agent base including an acryl-based attaching agent as a raw material;
   about 5 to about 40 parts by weight of a terpene-based tackiness improver;
   about 0.5 to about 5 parts by weight of an epoxy-based crosslinking agent; and
   about 5 to about 60 parts by weight of a flame retardant including at least one selected from the group consisting of a halogen-based flame retardant, an antimony flame retardant, a phosphorus-based flame retardant, and a combination thereof,
   based on 100 parts by weight of a solvent excluding benzene, toluene and xylene (BTX),
   wherein the acryl-based attaching agent comprises butyl acylate (BAM), 2-hexyl ethyl acrylate (2-HEA), or a mixture thereof as a main monomer,
   wherein the solvent includes about 5 to about 40 wt % of a $C_2$ to $C_{10}$ fatty acid ketone compound; about 20 to about 80 wt % of a $C_1$ to $C_{10}$ acetate compound; about 1 to about 10 wt % of a $C_1$ to $C_{10}$ alcohol compound; and about 1 to about 50 wt % of normal/cyclohexane compound, based on the total weight of the solvent,
   wherein a glass transition temperature of the adhesive composition is about −50 to about −30° C.

2. The environment-friendly adhesive composition of claim 1, wherein the halogen-based flame retardant in the flame retardant and the antimony flame retardant in the flame retardant are mixed at a weight ratio of about 90 to 100:about 45 to 50.

3. An adhesive tape manufactured using the adhesive composition according to claim 1.

4. The adhesive tape of claim 3, wherein a base material for manufacturing the tape is selected from the group consisting of polyethylene terephthalate (PET), polyethylene (PE), and polyimide (PI).

* * * * *